(12) United States Patent
Liang et al.

(10) Patent No.: US 12,222,590 B2
(45) Date of Patent: Feb. 11, 2025

(54) LITHIUM NIOBATE WAVEGUIDE HAVING WEAK PHASE DRIFT

(71) Applicant: SHANGHAI LYCORE TECHNOLOGIES Co., Ltd., Shanghai (CN)

(72) Inventors: Hanxiao Liang, Shanghai (CN); Yipin Song, Shanghai (CN); Yingcong Zhou, Shanghai (CN); Haicang Wu, Shanghai (CN); Wenhao Mao, Shanghai (CN); Shiwei Song, Shanghai (CN); Weiqi Sun, Shanghai (CN); Qingyang Yu, Shanghai (CN)

( * ) Notice: Subject to any disclaimer, the term of this patent is extended or adjusted under 35 U.S.C. 154(b) by 285 days.

(21) Appl. No.: 17/638,819

(22) PCT Filed: May 14, 2021

(86) PCT No.: PCT/CN2021/093946
§ 371 (c)(1),
(2) Date: Feb. 26, 2022

(87) PCT Pub. No.: WO2021/228254
PCT Pub. Date: Nov. 18, 2021

(65) Prior Publication Data
US 2022/0308371 A1    Sep. 29, 2022

(30) Foreign Application Priority Data
May 14, 2020   (CN) .......................... 202010410353.4

(51) Int. Cl.
*G02F 1/035*   (2006.01)
(52) U.S. Cl.
CPC ........ *G02F 1/035* (2013.01); *G02F 2201/063* (2013.01)

(58) Field of Classification Search
CPC . G02F 1/035; G02F 2202/20; G02F 2201/063
See application file for complete search history.

(56) References Cited

U.S. PATENT DOCUMENTS

| 10,921,682 B1* | 2/2021 | Wang ..................... G02F 1/225 |
| 2017/0219854 A1 | 8/2017 | Simin et al. |

(Continued)

FOREIGN PATENT DOCUMENTS

| CN | 103094396 A | 5/2013 | |
| CN | 108681111 A * | 10/2018 | ........... G02F 1/0316 |

(Continued)

OTHER PUBLICATIONS

CN_111061071_A (English Translation) (Year: 2020).*

(Continued)

*Primary Examiner* — Marin Pichler
*Assistant Examiner* — Mary A El-Shammaa

(57) ABSTRACT

A lithium niobate waveguide having weak phase drift includes a lithium niobate layer, a metal electrode, and a substrate layer. The lithium niobate layer includes a lithium niobate central ridge and lithium niobate extension surfaces extending towards two sides of the lithium niobate central ridge. A metal oxide layer is arranged on the upper surface of the lithium niobate central ridge. The substrate layer is located on the lower surface of the lithium niobate layer and is made of silicon, silicon dioxide, a multilayer material made of silicon and silicon dioxide or a multilayer material made of silicon dioxide, metal, and silicon, so as to further realize the purpose of inhibiting phase drift. Compared with other doped structures or other structures, the structure is simple in manufacturing method, and moreover, a very good phase drift suppression effect is achieved.

7 Claims, 3 Drawing Sheets

(56) References Cited

U.S. PATENT DOCUMENTS

| | | | |
|---|---|---|---|
| 2018/0323878 A1* | 11/2018 | Kawakami | H04B 10/516 |
| 2020/0041824 A1* | 2/2020 | Ohmori | G02F 1/035 |

FOREIGN PATENT DOCUMENTS

| | | | | | |
|---|---|---|---|---|---|
| CN | 109298551 | A | | 2/2019 | |
| CN | 110568551 | A | | 12/2019 | |
| CN | 110989214 | A | * | 4/2020 | G02F 1/0018 |
| CN | 111061071 | A | * | 4/2020 | G02F 1/0305 |
| CN | 111522154 | A | | 8/2020 | |
| JP | H116932 | A | | 1/1999 | |
| JP | 2006201732 | A | | 8/2006 | |
| WO | 2012124830 | A1 | | 9/2012 | |
| WO | WO-2021007806 | A1 | * | 1/2021 | G02B 6/12007 |

OTHER PUBLICATIONS

CN_110989214_A (English Translation) (Year: 2020).*
CN_108681111 (English Translation) (Year: 2018).*
WO_2021007806_A1 (English Translation) (Year: 2021).*

* cited by examiner

LITHIUM NIOBATE WAVEGUIDE HAVING WEAK PHASE DRIFT

CROSS-REFERENCE TO RELATED APPLICATIONS

This application claims priority to Chinese patent application No. 2020104103534, filed to the China National Intellectual Property Administration on May 14, 2020 and entitled "LITHIUM NIOBATE WAVEGUIDE HAVING WEAK PHASE DRIFT", the disclosure of which is hereby incorporated by reference in its entirety. See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The disclosure relates to the field of electronic communication, and specifically, to a lithium niobate waveguide having weak phase drift.

2. Description of Related Art Including Information Disclosed Under 37 CFR 1.97 and 37 CFR 1.98

Lithium niobate is one of the materials widely used in optoelectronic devices. The various optical-electrical characteristics of lithium niobate, such as low operating voltage and low transmission loss, make it used in the manufacturing of various optoelectronic devices, such as optical waveguides, high-speed optical modulators, optical converters, and so on. In recent years, as thin film lithium niobate-on-insulator develops, thin film lithium niobate optical waveguides compatible with modern integrated circuit manufacturing processes have been widely studied. The thin film lithium niobate optical waveguides are applicable to high-speed optoelectronic devices, such as a Mach-Zehnder optical modulator and a micro-ring resonator.

Integrated optical circuit devices such as modulators and optical switches need an appropriate bias operating point for normal operation, that is, an appropriate phase bias point is applied to the devices. To give a few examples, when the lithium niobate modulator is applicable to an optical communication system, a bit error rate needs to be reduced, which requires a basically stable bias operating point. When the modulator is applied to a CATV system, the best linearity can be obtained through interference and near a $\pi/2$ phase bias operating point. When the modulator is applied to the optical switch, an appropriate bias voltage is also required to adjust the maximum or minimum light transmittance to map a zero point or a $\pi$ phase bias point. However, the phase stability of the lithium niobate waveguide modulator may be affected by a series of external environments, such as the influence of an external electric field, a mechanical force, a temperature, and the like, resulting in drifting of a modulation phase, so that zero bias of the device drifts with changing amplitude and changing frequency. Such drifting may cause the failure of a lithium niobate waveguide device, and limit the application of the lithium niobate waveguide device in an actual environment.

BRIEF SUMMARY OF THE INVENTION

This application is mainly intended to provide a lithium niobate waveguide having weak phase drift, to achieve a purpose of inhibiting phase drift and improve the operation stability of devices.

In order to implement the above purpose, this application provides a lithium niobate waveguide having weak phase drift, including a lithium niobate layer, a metal electrode and a substrate layer. The lithium niobate layer includes a lithium niobate central ridge and lithium niobate extension surfaces extending towards two sides of the lithium niobate central ridge. A metal oxide layer is disposed on an upper surface of the lithium niobate central ridge. The substrate layer is located on a lower surface of the lithium niobate layer.

Preferably, the substrate layer is made of silicon, silicon dioxide, a multilayer material made of silicon and silicon dioxide or a multilayer material made of silicon dioxide, metal, and silicon.

Preferably, the metal oxide layers are disposed on upper surfaces of the lithium niobate extension surfaces and a side surface of the central ridge.

Preferably, the lithium niobate waveguide having weak phase drift further includes a covering layer. The covering layer is located on upper surfaces of the metal oxide layers and the lithium niobate layer not covered with metal oxide. The covering layer is made of silicon dioxide.

Preferably, the metal electrode is connected to the upper surfaces of the metal oxide layers.

Preferably, the metal electrode passes through partial or all of the metal oxide layers, and/or partial or all of the lithium niobate extension surfaces, and/or partial or all of the lower substrate layer to be connected to a surface of a lowermost layer that is passed through.

Preferably, the metal electrode is connected to the upper surfaces of the lithium niobate extension surfaces.

Preferably, the metal electrode passes through partial or all of the lithium niobate extension surfaces, and/or partial or all of the lower substrate layer to be connected to a surface of a lowermost layer that is passed through.

Preferably, the metal electrode passes through partial or all of the covering layer, partial or all of the metal oxide layers, and/or partial or all of the lithium niobate extension surfaces, and/or partial or all of the lower substrate layer to be connected to a surface of a lowermost layer that is passed through.

Preferably, a top surface of the metal electrode is higher, lower or equal to a surface height of the covering layer.

Preferably, the metal electrode is located in the substrate layer.

Preferably, an outer surface of each metal oxide layer is a wavy structure, and the maximum thickness of the metal oxide layer is less than 2 μm.

Preferably, the metal oxide layer is made of aluminum oxide, hafnium oxide, tantalum oxide, zirconium dioxide, titanium dioxide, or the like.

Preferably, a thickness of the lithium niobate central ridge ranges from 0.2 to 3 μm, a thickness of each lithium niobate extension surface ranges from 0.1 to 1 μm, and a width of the lithium niobate central ridge ranges from 0.3 to 3 μm.

This application has the following beneficial effects. By covering or partially covering the metal oxide layer, such as aluminum oxide, hafnium oxide, tantalum oxide, zirconium dioxide or titanium dioxide, on a surface of the lithium niobate waveguide to absorb free electrons in a material, the metal electrode may be not only disposed on the surface of the metal oxide layer, but also directly disposed on a surface of the lithium niobate layer, so that the purpose of inhibiting phase drift can be further achieved. The structure of the lithium niobate waveguide is simple in structure. Compared with other doped structures or other structures, the structure is simple in manufacturing method. In addition, a desirable phase drift inhibition effect is achieved.

BRIEF DESCRIPTION OF THE SEVERAL VIEWS OF THE DRAWINGS

In order to more clearly illustrate the specific implementations of the disclosure or the technical solutions in the related art, the drawings used in the description of the specific implementations or the related art will be briefly described below. It is apparent that the drawings in the following descriptions are only some implementations of the disclosure. Other drawings can be obtained from those skilled in the art according to these drawings without any creative work.

Figure 1:
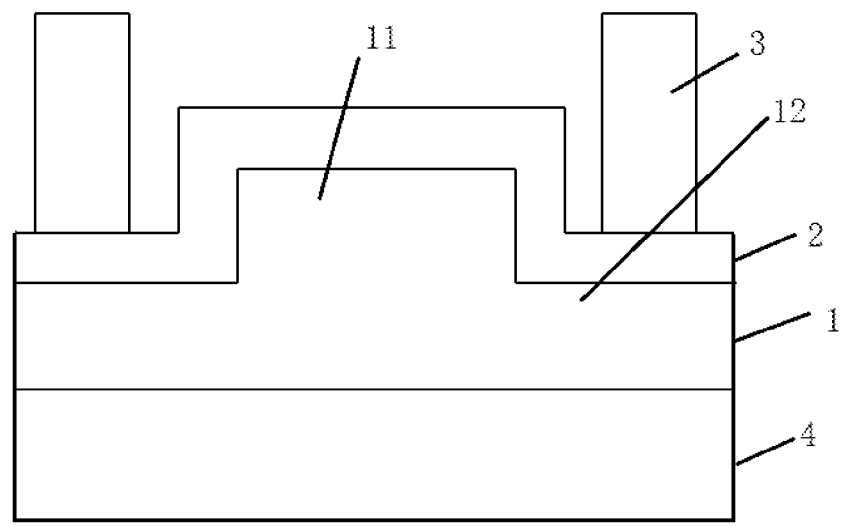
FIG. 1 is a schematic view of a specific embodiment I of a lithium niobate waveguide having weak phase drift.

In the drawings, 1—Lithium niobate layer, 2—Metal oxide layer, 3—Metal electrode, 4—Substrate layer, 11—Lithium niobate central ridge, 12—Lithium niobate extension surface, 5—Covering layer.

DETAILED DESCRIPTION OF THE INVENTION

In order to enable those skilled in the art to better understand the solutions of the disclosure, the technical solutions in the embodiments of the disclosure will be clearly and completely described below in combination with the drawings in the embodiments of the disclosure. It is apparent that the described embodiments are only part of the embodiments of the disclosure, not all the embodiments. Based on the embodiments in the disclosure, all other embodiments obtained by those of ordinary skilled in the art without creative work shall fall within the protection scope of the disclosure.

It is to be noted that terms "first", "second" and the like in the description, claims and the above mentioned drawings of the disclosure are used for distinguishing similar objects rather than describing a specific sequence or a precedence order. It should be understood that the data used in such a way may be exchanged where appropriate, in order that the embodiments of the disclosure described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

In the disclosure, terms "mount", "configure", "provide", "connect", "link" and "sleeved" should be broadly understood. For example, the term "connect" may be fixed connection, detachable connection or integral construction. As an alternative, the term "connect" may be mechanical connection, or electrical connection. As an alternative, the term "connect" may be direct connection, or indirect connection through a medium, or communication in two devices, components or constituting parts. For those of ordinary skill in the art, specific meanings of the above mentioned terms in the disclosure may be understood according to a specific condition.

It is to be noted that the embodiments in the disclosure and the features in the embodiments may be combined with one another without conflict. The disclosure will be described below in detail with reference to the drawings and the embodiments.

Embodiment 1

As shown in FIG. 1, the disclosure provides a lithium niobate waveguide having weak phase drift. The lithium niobate waveguide having weak phase drift includes a lithium niobate layer 1 and a metal electrode 3. The lithium niobate layer 1 includes a lithium niobate central ridge 11 and lithium niobate extension surfaces 12 extending towards two sides of the lithium niobate central ridge 11. A metal oxide layer 2 is disposed on an upper surface of the lithium niobate central ridge 11. The substrate layer 4 is located on a lower surface of the lithium niobate layer. The substrate layer is made of a silicon dioxide material. The metal electrode 3 is connected to the upper surfaces of the lithium niobate extension surfaces 12. A thickness of the lithium niobate central ridge is 0.2 μm, a thickness of each lithium niobate extension surface is 0.1 μm, and a width of the lithium niobate central ridge is 0.3 μm. The metal oxide layer is made of aluminum oxide.

Embodiment 2

Figure 2:
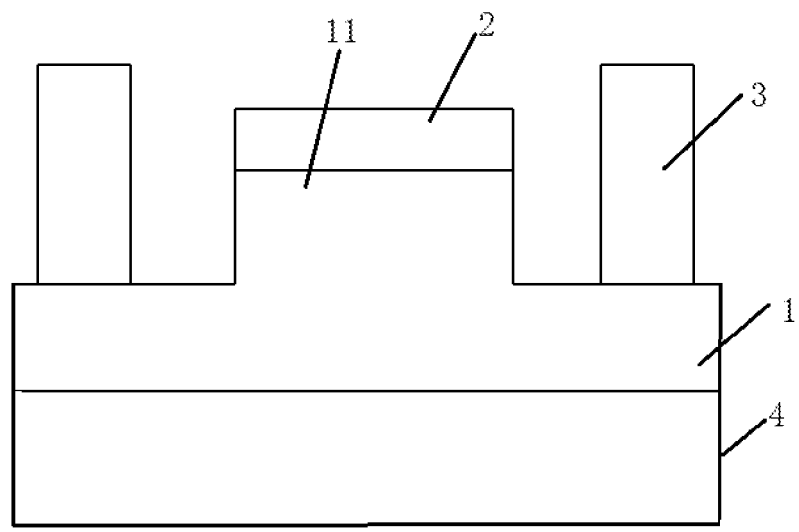
FIG. 2 is a schematic view of a specific embodiment II of a lithium niobate waveguide having weak phase drift.

As shown in FIG. 2, the disclosure provides a lithium niobate waveguide having weak phase drift. The lithium niobate waveguide having weak phase drift includes a lithium niobate layer and a metal electrode. The lithium niobate layer includes a lithium niobate central ridge and lithium niobate extension surfaces extending towards two sides of the lithium niobate central ridge. A metal oxide layer is disposed on an upper surface of the lithium niobate central ridge. Metal oxide layers 2 are disposed on upper surfaces of the lithium niobate extension surfaces. The substrate layer 4 is located on a lower surface of the lithium niobate layer. The substrate layer is made of a silicon material. The metal electrode 3 is connected to the upper surfaces of the metal oxide layers 2. A thickness of the lithium niobate central ridge is 1.2 μm, a thickness of each lithium niobate extension surface is 0.6 μm, and a width of the lithium niobate central ridge is 1.5 μm. The metal oxide layer is made of aluminum oxide or hafnium oxide.

Embodiment 3

Figure 3:
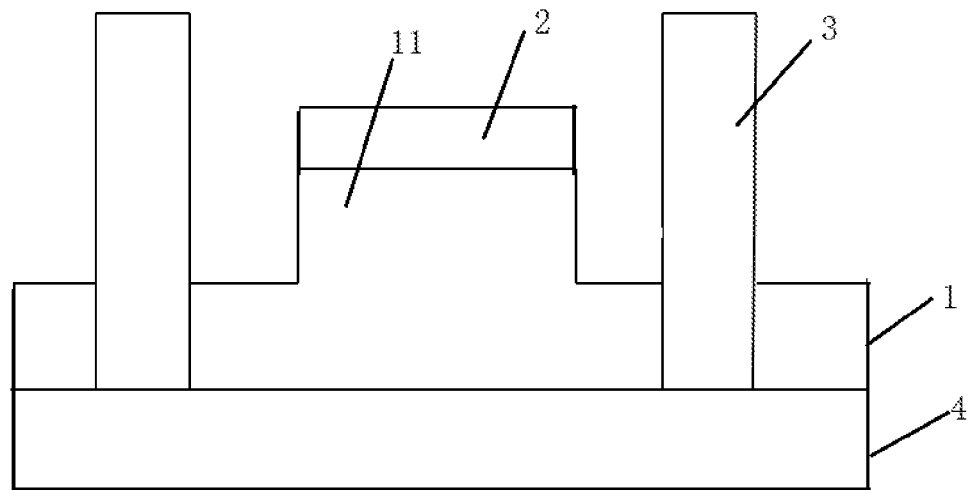
FIG. 3 is a schematic view of a specific embodiment III of a lithium niobate waveguide having weak phase drift.

As shown in FIG. 3, the disclosure provides a lithium niobate waveguide having weak phase drift. The lithium niobate waveguide having weak phase drift includes a lithium niobate layer 1, a metal electrode 3 and a substrate layer 4. The lithium niobate layer includes a lithium niobate central ridge and lithium niobate extension surfaces extending towards two sides of the lithium niobate central ridge. A metal oxide layer is disposed on an upper surface of the lithium niobate central ridge. The substrate layer 4 is located on a lower surface of the lithium niobate layer. The metal electrode passes through the lithium niobate extension surfaces to be connected to the substrate layer 4. The substrate layer 4 is made of silicon, silicon dioxide, a multilayer material made of silicon and silicon dioxide or a multilayer material made of silicon dioxide, metal, and silicon. A thickness of the lithium niobate central ridge is 3 μm, a thickness of each lithium niobate extension surface is 1 μm, and a width of the lithium niobate central ridge is 3 μm. The metal oxide layer is made of tantalum oxide or zirconium dioxide.

Embodiment 4

Figure 4:
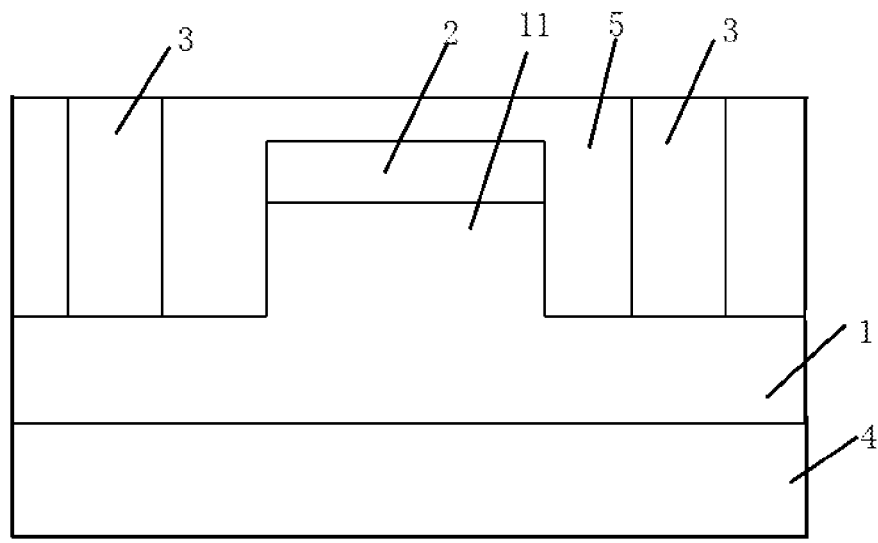
FIG. 4 is a schematic view of a specific embodiment IV of a lithium niobate waveguide having weak phase drift.

As shown in FIG. 4, the disclosure provides a lithium niobate waveguide having weak phase drift. The lithium niobate waveguide having weak phase drift includes a lithium niobate layer 1, a metal electrode 3, a substrate layer 4 and a covering layer 5. The lithium niobate layer 1 includes a lithium niobate central ridge and lithium niobate extension surfaces extending towards two sides of the lithium niobate central ridge. A metal oxide layer is disposed on an upper surface of the lithium niobate central ridge. The substrate layer is located on a lower surface of the lithium niobate layer. The metal electrode 3 is connected to the lithium niobate layer 1. The covering layer 5 is disposed on the upper surface of the metal oxide layer. The substrate layer is made of a silicon dioxide material. The metal electrode is located in the substrate layer 4. A thickness of the lithium niobate central ridge is 0.6 μm, a thickness of each lithium niobate extension surface is 0.5 μm, and a width of the lithium niobate central ridge is 0.8 μm. The metal oxide layer is made of aluminum oxide, hafnium oxide, tantalum oxide, zirconium dioxide or titanium dioxide.

Embodiment 5

Figure 5:
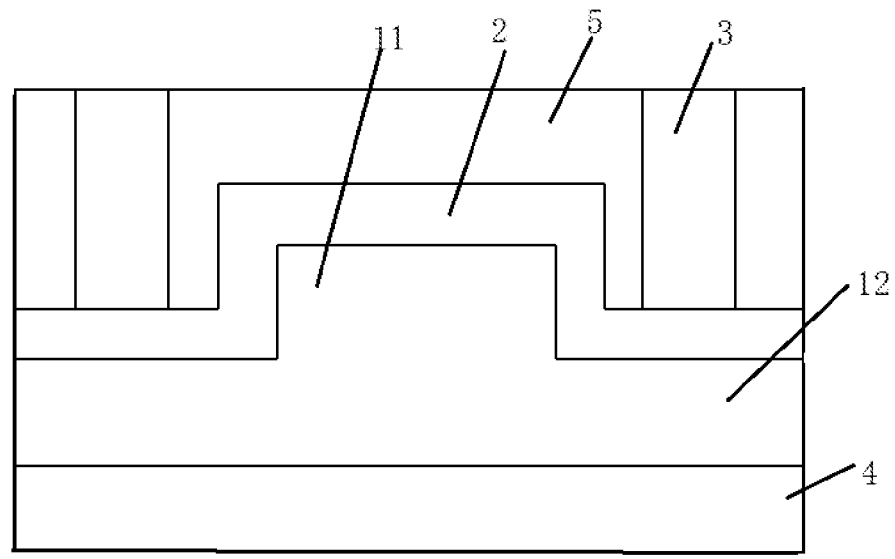
FIG. 5 is a schematic view of a specific embodiment V of a lithium niobate waveguide having weak phase drift.

As shown in FIG. 5, the disclosure provides a lithium niobate waveguide having weak phase drift. The lithium niobate waveguide having weak phase drift includes a lithium niobate layer 1, a metal electrode 3, a substrate layer 4 and a covering layer 5. The lithium niobate layer includes a lithium niobate central ridge and lithium niobate extension surfaces extending towards two sides of the lithium niobate central ridge. A metal oxide layer is disposed on an upper surface of the lithium niobate central ridge. The metal oxide layers are disposed on upper surfaces of the lithium niobate extension surfaces. The substrate layer 4 is located on a lower surface of the lithium niobate layer 1. The substrate layer is made of a silicon dioxide material. The metal electrode 4 is connected to the metal oxide layers 2. The covering layer 5 is located on the upper surfaces of the metal oxide layers 2. The metal electrode 3 is located in the covering layer 5. A thickness of the lithium niobate central ridge is 0.8 μm, a thickness of each lithium niobate extension surface is 0.5 μm, and a width of the lithium niobate central ridge is 1.2 μm. The metal oxide layer is made of aluminum oxide, hafnium oxide, tantalum oxide, zirconium dioxide or titanium dioxide.

Embodiment 6

Figure 6:
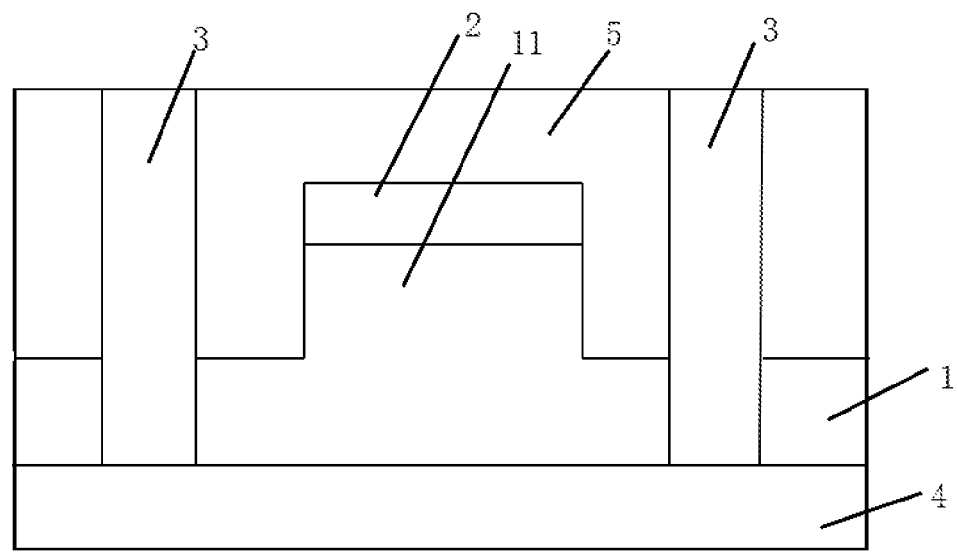
FIG. 6 is a schematic view of a specific embodiment VI of a lithium niobate waveguide having weak phase drift.

As shown in FIG. 6, the disclosure provides a lithium niobate waveguide having weak phase drift. The lithium niobate waveguide having weak phase drift includes a lithium niobate layer 1, a metal electrode 3, a substrate layer 4 and a covering layer 5. The lithium niobate layer includes a lithium niobate central ridge and lithium niobate extension surfaces extending towards two sides of the lithium niobate central ridge. A metal oxide layer is disposed on an upper surface of the lithium niobate central ridge. The metal oxide layers are disposed on upper surfaces of the lithium niobate extension surfaces. The substrate layer 4 is located on a lower surface of the lithium niobate layer. The metal electrode passes through the lithium niobate extension surfaces to be connected to the substrate layer 4. The covering layer 5 is located on the upper surfaces of the metal oxide layers. The substrate layer 4 is made of a multilayer material made of silicon and silicon dioxide. The metal electrode is located in the substrate layer 4. A thickness of the lithium niobate central ridge is 0.6 μm, a thickness of each lithium niobate extension surface is 0.5 μm, and a width of the lithium niobate central ridge is 0.8 μm. The metal oxide layer is made of aluminum oxide, hafnium oxide, tantalum oxide, zirconium dioxide, titanium dioxide, or the like.

By covering or partially covering the metal oxide layer, such as aluminum oxide, hafnium oxide, tantalum oxide, zirconium dioxide or titanium dioxide, on a surface of the lithium niobate waveguide to absorb free electrons in a material, the metal electrode may be not only disposed on the surface of the metal oxide layer, but also directly disposed on a surface of the lithium niobate layer or may be disposed on the surface of the silicon dioxide substrate layer by passing through the metal oxide layer and the lithium niobate layer, so that the purpose of inhibiting phase drift can be further achieved. The structure of the lithium niobate waveguide is simple in structure. Compared with other doped structures or other structures, the structure is simple in manufacturing method. In addition, a desirable phase drift inhibition effect is achieved.

Although the implementations of the disclosure are described with reference to the accompanying drawings, those skilled in the art can make various modifications and variations to the disclosure without departing from the spirit and scope of the disclosure. Thus, such modifications and variations of the disclosure fall within the scope of the appended claims.

We claim:

1. A lithium niobate waveguide having weak phase drift, comprising:
   a lithium niobate layer,
   a metal electrode, and
   a substrate layer, wherein the lithium niobate layer comprises a lithium niobate central ridge and lithium niobate extension surfaces extending towards two sides of the lithium niobate central ridge, wherein a metal oxide layer is disposed on an upper surface of the lithium niobate central ridge, and wherein the substrate layer is located on a lower surface of the lithium niobate layer, wherein a thickness of the lithium niobate central ridge ranges from 0.2 to 3 µm, a thickness of each lithium niobate extension surface ranges from 0.1 to 1 µm, and a width of the lithium niobate central ridge ranges from 0.3 to 3 µm, wherein the metal oxide layer is disposed on upper surfaces of the lithium niobate extension surfaces and a side surface of the central ridge, wherein the metal electrode passes through partial or all of the metal oxide layers, and/or partial or all of the lithium niobate extension surfaces, and/or partial or all of the lower substrate layer to be connected to a surface of a lowermost layer that is passed through.

2. The lithium niobate waveguide having weak phase drift as claimed in claim 1, wherein the substrate layer is comprised of silicon, silicon dioxide, a multilayer material made of silicon and silicon dioxide or a multilayer material made of silicon dioxide, metal, and silicon.

3. The lithium niobate waveguide having weak phase drift as claimed in claim 1, wherein the metal electrode is connected to the upper surfaces of the metal oxide layers.

4. The lithium niobate waveguide having weak phase drift as claimed in claim 1, wherein the metal electrode is connected to the upper surfaces of the lithium niobate extension surfaces.

5. The lithium niobate waveguide having weak phase drift as claimed in claim 1, wherein the metal electrode passes through partial or all of the lithium niobate extension surfaces, and/or partial or all of the lower substrate layer to be connected to a surface of a lowermost layer that is passed through.

6. The lithium niobate waveguide having weak phase drift as claimed in claim 1, wherein the maximum thickness of the metal oxide layers is less than 2 µm.

7. The lithium niobate waveguide having weak phase drift as claimed in claim 1, wherein the metal oxide layers is comprised of aluminum oxide, hafnium oxide, tantalum oxide, zirconium dioxide or titanium dioxide.

* * * * *